(12) United States Patent
Winkelhake et al.

(10) Patent No.: US 8,381,898 B2
(45) Date of Patent: Feb. 26, 2013

(54) APPARATUS FOR PUSHING GLASS ARTICLES ONTO A BELT CONVEYOR

(75) Inventors: Dirk Winkelhake, Nienstädt (DE);
Matthias Hübner, Stadthagen (DE);
Benedikt Felgenhauer, Herford (DE)

(73) Assignee: Heye International GmbH (DE)

( * ) Notice: Subject to any disclaimer, the term of this patent is extended or adjusted under 35 U.S.C. 154(b) by 75 days.

(21) Appl. No.: 12/997,634

(22) PCT Filed: Jun. 4, 2009

(86) PCT No.: PCT/EP2009/003985
§ 371 (c)(1),
(2), (4) Date: May 24, 2011

(87) PCT Pub. No.: WO2009/149859
PCT Pub. Date: Dec. 17, 2009

(65) Prior Publication Data
US 2012/0009048 A1   Jan. 12, 2012

(30) Foreign Application Priority Data

Jun. 12, 2008 (DE) .......................... 10 2008 027 911

(51) Int. Cl.
*B65G 25/00* (2006.01)
(52) U.S. Cl. ........ 198/430; 198/723; 198/739; 198/743; 198/745
(58) Field of Classification Search .................. 198/429, 198/430, 370.07, 468.1, 722, 723, 739–749
See application file for complete search history.

(56) References Cited

U.S. PATENT DOCUMENTS

| | | | | |
|---|---|---|---|---|
| 3,595,365 A | * | 7/1971 | Faure | 198/468.01 |
| 4,414,758 A | * | 11/1983 | Peter et al. | 34/233 |
| 6,494,063 B1 | * | 12/2002 | Malek | 65/260 |
| 7,264,108 B2 | * | 9/2007 | Borsarelli et al. | 198/429 |
| 7,930,902 B2 | * | 4/2011 | Simon et al. | 65/260 |
| 2005/0193773 A1 | | 9/2005 | Winkelhake et al. | |
| 2007/0187210 A1 | | 8/2007 | Kammonen | |

FOREIGN PATENT DOCUMENTS

| | | |
|---|---|---|
| CH | 698252 B1 | 6/2009 |
| DE | 102004010238 B3 | 6/2005 |
| DE | 102004007507 A1 | 9/2005 |
| EP | 1627858 A1 | 2/2006 |
| GB | 2435025 A | 8/2007 |

* cited by examiner

*Primary Examiner* — Mark A Deuble
(74) *Attorney, Agent, or Firm* — Fox Rothschild LLP

(57) ABSTRACT

An apparatus for pushing hollow glass articles from a depositing plate of an IS glass molding machine onto a belt conveyor comprises a transfer pusher (11), one end of which is rigidly connected to a vertical shaft (10) and the other end of which carries an arrangement of pushing fingers for the glass articles. The shaft (10) is supported in a rotary table (6) and functionally connected to a first rotary drive (13) carried by the rotary table while the rotary plate (6) is mounted on a bell-shaped bearing (24) supported on a console (1) by means of a hollow shaft (22), namely such that it is functionally connected to a second rotary drive (15'). An approximately exponential transfer curve of the pushing fingers that begins at the depositing plate and ends on the belt conveyor and subjects the hollow glass articles to the least possible stress can be realized.

20 Claims, 3 Drawing Sheets

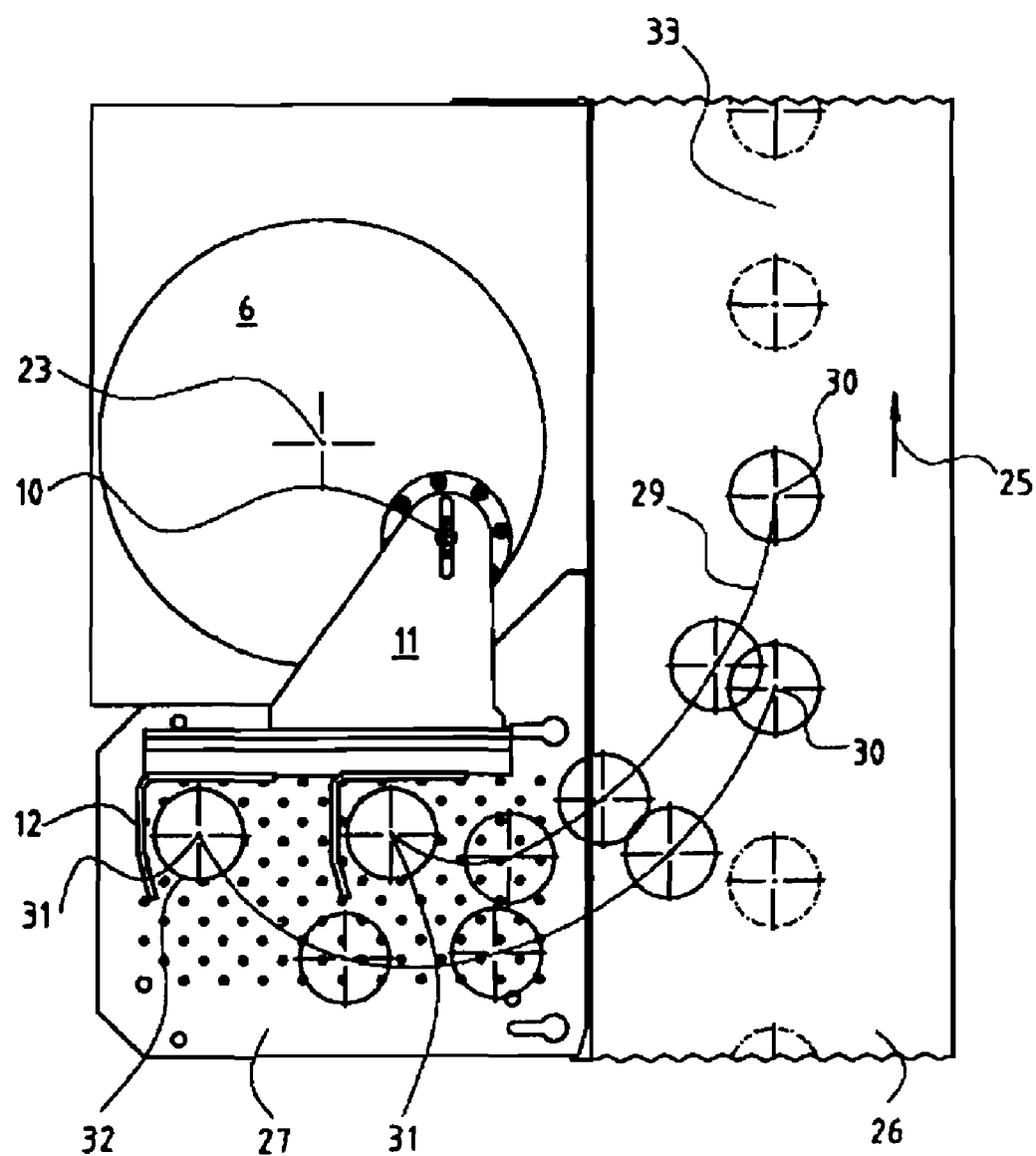

APPARATUS FOR PUSHING GLASS ARTICLES ONTO A BELT CONVEYOR

BACKGROUND OF THE INVENTION

The invention pertains to an apparatus for horizontally pushing articles, particularly hollow glass articles, from a stationary depositing plate of an IS glass molding machine onto a belt conveyor that moves rectilinearly with a uniform speed.

The process of manufacturing hollow glass articles from the molding of a glass gob in a blank mold and the finish mold up to the treatment in a cooling furnace is characterized by numerous transport and manipulation processes, wherein the attainable production yield depends on the speed and reliability of these processes. This applies, among other things, to the process of transferring articles that were removed from a finish mold and deposited on a stationary depositing plate onto a moving belt conveyor, on which the articles need to be positioned successively in the form of a row arrangement. Since such a belt conveyor in IS-machines (individual section) usually cooperates with a plurality of manufacturing stations, each of which is provided with a depositing plate, on which at least two finish-molded articles need to be deposited in a cyclic fashion, the transfer onto the belt conveyor needs to be coordinated with the speed thereof, as well as the operating cycle of the manufacturing stations, in order to form a defined row on the belt.

Various types of transfer pushers are known as manipulation elements that directly cooperate with the hollow glass articles, wherein the ends of the transfer pushers that face the article feature pushing fingers that are in contact with the articles during the transfer process. The transfer process needs to be realized in such a way that it can be carried out quickly within a predetermined time interval. It is also necessary to prevent the article standing on the depositing plate from a toppling over and being damaged; that is the article needs to stands on the belt conveyor in a defined position, namely a transfer point, at the end of the transfer curve and move with the same speed as the belt. Depending on the transfer curve realized between a receiving point on the depositing plate and a transfer point on the belt conveyor, however, the article is subjected to accelerations in the radial and the tangential direction, wherein these accelerations need to be controlled to achieve an accurately positioned and undamaged transfer onto the belt conveyor. However, the control becomes problematic and requires special safety measures at higher speeds.

EP 1 627 858 A1 discloses a transfer apparatus having a lever that can be pivoted about a vertical, stationarily arranged axis on one of its ends. On its other end it carries one end of a second lever such that it can also be pivoted about a vertical axis, wherein a transfer pusher that is equipped with three pushing fingers is supported on the other end of the second lever such that it can be pivoted about a horizontal axis. The rotations of the first lever about the stationary axis, of the second lever relative to the first lever and of the transfer pusher relative to the second lever are realized with drives that can be controlled independently of one another such that a transfer curve from a receiving point on a depositing plate up to a transfer point can be realized in the form of a superposition of three partial movements. At least two of the rotary drives required for realizing these three partial movements are arranged stationarily.

DE 10 2004 010 238 B3 discloses another transfer apparatus, in which the transfer movement of a transfer pusher carrying pushing fingers between a depositing plate and a moving belt conveyor is realized in the form of three rotational movements that can be controlled independently of one another. The superposition of the three movements results in a transfer curve that extends from a receiving point on the depositing plate to a contact point tangentially to the moving direction of the belt conveyor and continues with the same speed and direction as the movement of the belt conveyor by a defined linear path element after this contact point until a separation point is reached, at which the pushing fingers are disengaged. This measure serves for additionally securing the position of the hollow glass articles during the transfer. However, these transfer apparatuses, having three axes to be controlled, are comparatively complex with respect to the control technology, and, in particular their manufacturing design because three stationarily arranged rotary drives are required.

GB 2 435 025 A discloses a comparable apparatus, in which the transfer curve of a transfer pusher between a depositing plate and a moving belt conveyor is realized in the form of a superposition of the rotational movements generated by two rotary drives that are stationarily arranged adjacent to one another. In this case, two gear mechanisms are required, namely for the rotation about a common main axis and for transmitting a rotational movement from the main axis to the rotational axis of the transfer pusher. This means that both gear mechanisms always rotate during a rotation of the transfer pusher.

CH 698 252 B1 discloses another apparatus, in which the transfer curve of a transfer pusher between a depositing plate and a moving belt conveyor is realized in the form of a superposition of the rotational movements generated by two rotary drives that are stationarily arranged in series. In this case, one gear mechanism is required, wherein one of the two rotary drives consists of a hollow shaft motor and the rotational movement also needs to be transmitted to the rotational axis of the transfer pusher. The difficulty in this respect would consist of locating a suitable hollow shaft motor.

Due to a reduction of the number of rotary drives to be used and controlled, the apparatuses disclosed in documents GB 2 435 025 A and CH 698 252 Bi provide certain advantages in comparison with the initially cited state of the art that is characterized by three rotary drives. However, these solutions also have the disadvantage that the two stationarily arranged rotary drives require the use of comparatively complicated gear mechanisms to constructively realize the superposition of two rotational movements. The gear mechanism components that are inevitably moved during each actuation of the transfer pusher increase the inertia of the entire system. In addition, elements are used in the surroundings of a glass molding machine, i.e., in an atmosphere that is characterized by heat, oil, dust and glass fragments and reduces the service life of the gear mechanism components. This is associated with high maintenance expenditures.

Document DE 10 2004 007 507 A1 discloses a device for shifting glass articles that is designed for transferring these glass articles from a first belt, on which they are successively arranged in a row, namely a relatively fast moving transverse belt, onto a second belt that moves relatively slow and perpendicular to the first belt, namely a longitudinal belt, on which they are adjacently arranged in groups transverse to the transport direction. The glass articles are transferred, for example, into a cooling furnace by means of the longitudinal belt, wherein the width of the longitudinal belt depends, among other things, with the width of the cooling furnace. In contrast to the initially cited state of the art, this consequently does not concern a movement from a depositing plate, i.e., a stationary starting point, onto a moving belt such that the kinematical conditions are different in this respect. This apparatus is characterized by a pusher bar that simultaneously takes hold of a certain number of glass articles that depends on the length of the bar on the first belt and transfers said glass articles onto the second belt while realizing an adaptation to the different speeds of the belts, wherein this transfer movement is realized in the form of a superposition of three rotational movements and consequently three rotary drives, one of which is arranged stationarily.

SUMMARY OF THE INVENTION

It is the objective of the invention to provide an apparatus of the initially described type above that additionally simplifies the realization of a secure positioning of hollow glass articles on the belt conveyor with low manufacturing expenditures. In such an apparatus, this objective is attained with the characteristics of the invention as described below. The invention provides an apparatus that uses a transfer pusher for horizontally pushing particles, particularly hollow glass articles, from a stationary depositing plate of an IS glass molding machine onto a belt belt conveyor that moves rectilinearly with a uniform speed.

The inventive drive system comprises only two axes to be controlled and accordingly is provided with only two rotary drives for generating rotational movements such that a transfer curve is realized in the form of a superposition of these two rotational movements. The objective of this transfer curve always consists of allowing an undamaged transfer of the articles onto the belt conveyor, namely within a defined time interval, such that a row of these article is formed on the belt conveyor. It was determined that such a drive system makes it possible to realize a transfer curve, as well as a transfer movement, that allows a safe transfer of the articles at high speeds in accordance with reproducible transfer points on the belt conveyor and therefore with one less axis to be controlled.

A rotary table is provided and functionally connected to the second rotary drive provided for realizing a second rotational movement. It is important that the first rotary drive provided for generating the first rotational movement is connected to the rotary table. Consequently, the second rotational movement that results from the rotation of the rotary plate and manifests itself in the form of a movement of the shaft carrying the transfer pusher about the axis of the rotary plate is superimposed with the rotational movement about the axis of this shaft.

According to the characteristics of one embodiment of the invention, the rotary drive that generates the first rotational movement is situated underneath the rotary plate such that a space-saving design can be achieved.

According to the characteristics of another embodiment, the apparatus is characterized by a console that serves for being mounted on the machine frame of an IS glass molding machine.

A variation of the invention is provided in which the rotary plate is supported on a vertical hollow shaft that is connected thereto and in turn supported by a stationary vertical axle. This axle transmits bearing forces to the console, on which the entire apparatus is factually supported.

A second variation of the invention is provided in which the underside of the rotary plate is supported on a hollow shaft that is connected thereto and in turn supported on a stationary bell-shaped bearing. The bell-shaped bearing transmits bearing forces to the console, on which the entire apparatus is also factually supported in this case.

According to other embodiments of the invention, the second rotary drive may be mounted on the hollow shaft in the aforementioned first variation and functionally connected to the stationary axle. It is always arranged underneath the rotary plate such that a particularly space-saving overall design can be achieved.

In still other embodiments, a housing is provided in which nearly all components of the drive system are accommodated. The housing provides mechanical and thermal protection for the aforementioned components and makes it possible, in particular, to achieve a space-saving design of the apparatus by arranging both rotary drives within this housing. Both rotary drives are arranged underneath the rotary plate.

With respect to the least possible mechanical stress on the articles during the pushing movement, it is particularly advantageous if, according to other features of the invention, the transfer curve, as well as the transfer movement, is realized such that a changing curvature such as, for example, an exponential curve or a curve approximated thereto results along the curve, wherein the pushing fingers move at least approximately tangential to the transport direction of the belt conveyor and with the same speed as the belt conveyor in the transfer point, in which the pushing fingers disengage from the articles. This can be achieved by adapting the rotational movements generated by the two rotary drives accordingly.

BRIEF DESCRIPTION OF THE DRAWINGS

The invention is described in greater detail below with reference to exemplary embodiments that are schematically illustrated in the drawings. In these drawings:

FIG. 3 shows a top view of the apparatus viewed in the direction III in FIG. 2.

DETAILED DESCRIPTION

Figure 1:
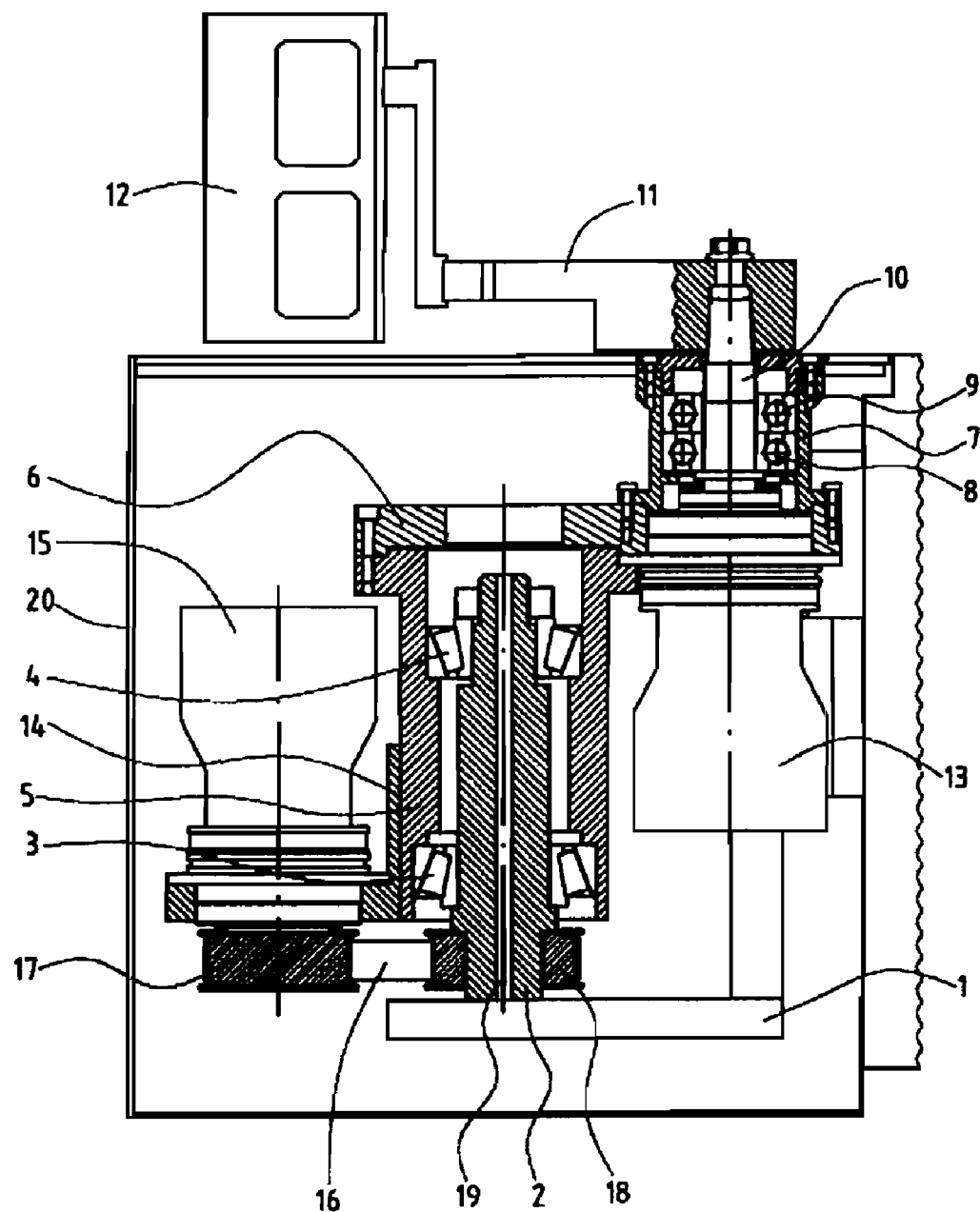
FIG. 1 shows a first exemplary embodiment of an inventive apparatus in the form of an axial section.

In FIG. 1, the reference symbol 1 identifies a horizontal console that is mounted on a not-shown machine frame of an IS-machine and on which a hollow shaft 5 is supported about a stationarily arranged, vertically extending hollow axle 2 by means of rolling bearings 3, 4, wherein said hollow shaft is connected to a rotary plate 6 on its upper end.

The rotary plate 6 is rigidly connected to a bearing flange 7, in which a shaft 10 is supported by means of rolling bearings 8, 9, wherein the upper end of said shaft is rigidly connected to one end of a horizontally extending transfer pusher 11, the other end of which is conventionally equipped with an arrangement of pushing fingers 12. The pushing fingers 12 of this arrangement are designed for directly contacting the hollow glass articles to be moved from a depositing plate onto a belt conveyor.

The reference symbol 13 identifies a first electric rotary drive such as, e.g., a servomotor that is arranged stationarily relative to the bearing flange 7 underneath the rotary plate 6, wherein the output shaft of this first electric rotary drive is functionally connected to the shaft 10. This first rotary drive 13 serves for generating a first rotational movement, namely the rotation of the transfer pusher 11 about the axis of the shaft 10 and therefore relative to the rotary plate 6.

The reference symbol 14 identifies a console that is mounted on the hollow shaft 5 and supports a second electric rotary drive 15 such as, e.g., a servomotor underneath the rotary plate 6, wherein the output shaft of this second electric rotary drive that extends parallel to the axle 2 is functionally connected to the stationary axle 2 by means of a traction mechanism such as, e.g., a belt drive 16.

The belt drive 16 consists of a first pulley 17 that is rotationally connected to the output shaft of the second rotary drive 15 and a second pulley 18 that is rigidly connected to the axle 2 such that a rotation of the rotary plate 6 about the axle 2 can be realized by means of the rotary drive 15.

One can ascertain that the absolute movement of the transfer pusher 11 and therefore the pushing fingers 12 results from a superposition of two rotational movements, namely a rotation of the rotary plate 6 about the axle 2 and a rotation of the transfer pusher 11 about the axis of the shaft 10.

One can furthermore ascertain that the mountings of both rotary drives 13, 15 are arranged movably, i.e., subjected to the rotational movement of the rotary plate 6, in this first variation of the inventive apparatus.

The reference symbol 19 identifies a conventional bore that is intended for conveying sealing air and centrally extends through the axle 2.

All drive components of the rotary plate 6, as well as of the transfer pusher 11, are situated within a graphically indicated housing 20, from the upper side of which protrudes the upper end of the shaft 10 that carries the transfer pusher 11.

Figure 2:
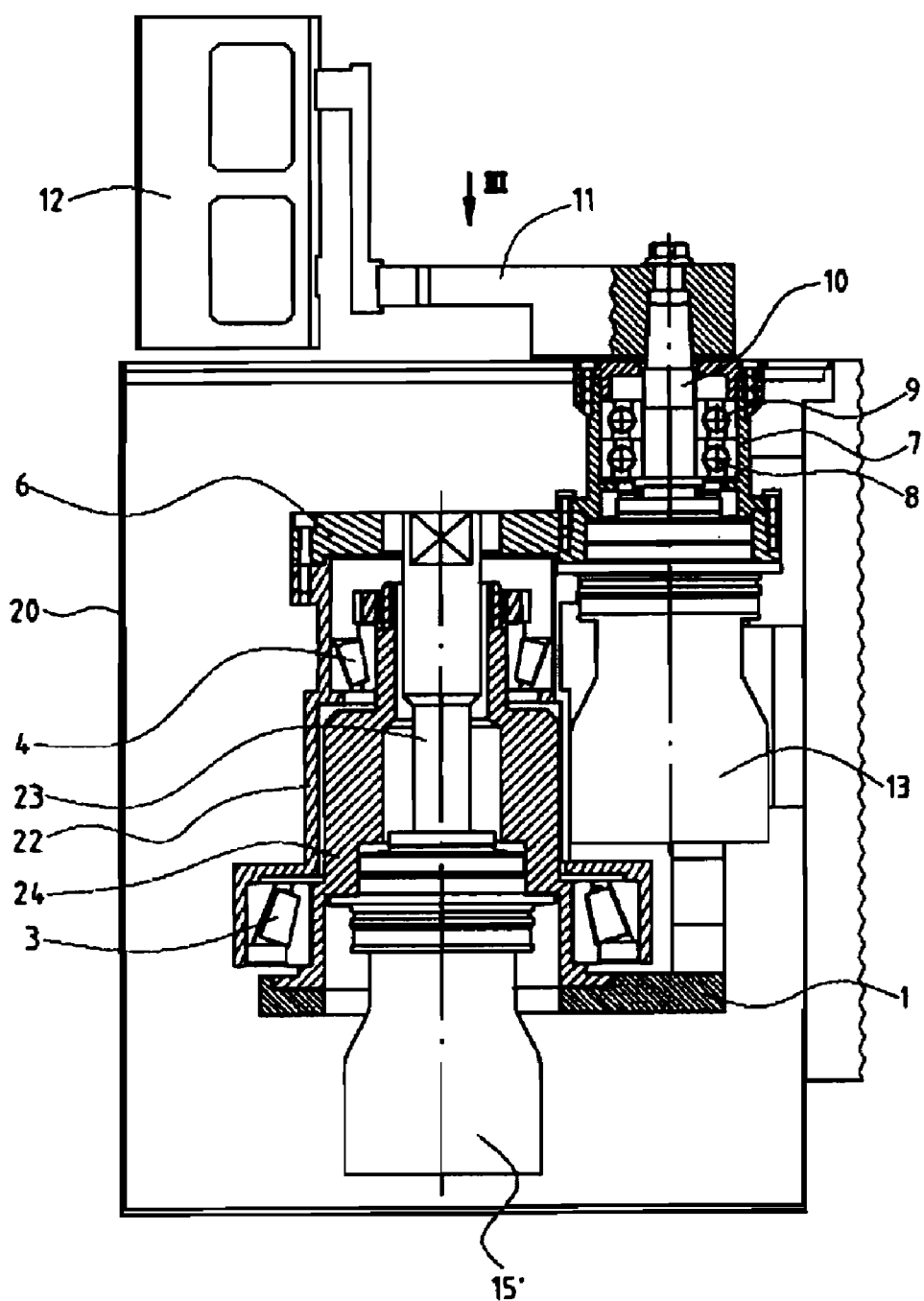
FIG. 2 shows a second exemplary embodiment of an inventive apparatus in the form of an axial section.

Functional elements that are illustrated in FIGS. 2 and 3 and correspond to those in FIG. 1 are identified by the same reference symbols and therefore not described anew.

In the second variation of the inventive apparatus illustrated in FIG. 2, a vertically extending bell-shaped bearing 24 realized in a hollow fashion is rigidly arranged on the console 1 within a housing 20. The second rotary drive 15' is rigidly connected to the bell-shaped bearing 24 and therefore also to the console 1, wherein the output shaft of this second rotary drive is functionally connected to a shaft 23 extending through the bell-shaped bearing 24.

A hollow shaft 22 is supported on the bell-shaped bearing 24 by means of rolling bearings 3, 4, wherein the upper end of said hollow shaft is rigidly connected to a rotary plate 6. In contrast to the exemplary embodiment according to FIG. 1, only the first rotary drive 13 is subjected to the rotational movement of the rotary plate 6 while the second rotary drive 15' is arranged stationarily.

FIG. 3 shows a top view of a belt conveyor 26 that moves in a direction 25 with uniform speed and extends directly past a depositing plate 27. The depositing plate 27 that is arranged at the same height and in a common plane with the belt conveyor 26 is conventionally provided with a bore pattern 28 that serves for conveying cooling air such that the hollow glass articles 32 deposited thereon are subjected to a cooling effect.

The movement of the transfer pusher 11 is a movement that is composed of a rotation about the stationary axis of the shaft 23 and a rotation about the axis of the shaft 10 that moves with the rotary plate 6, wherein the actual shape of a transfer curve 29, as well as the movement along this curve between a receiving point 31 on the depositing plate 12 and a transfer point 30 on the moving belt conveyor 26, can be realized in such a way by controlling the two rotary drives 13, 15' that the movement of the pushing fingers 12 and therefore of the hollow glass article 32 to be moved takes place at least approximately tangential to the direction 25 and with the same speed as the belt conveyor 26 in the transfer point 30.

In this way, the hollow glass articles 32 are prevented from being damaged and from toppling over during the transfer and a uniform row 33 consisting of these hollow glass articles can be formed on the belt conveyor 26, namely on the basis of a space-saving drive system with a relatively simple constructive design.

LIST OF REFERENCE SYMBOLS

1 Console
2 Axle
3 Rolling bearing
4 Rolling bearing
5 Hollow shaft
6 Rotary plate
7 Bearing flange
8 Rolling bearing
9 Rolling bearing
10 Shaft
11 Transfer pusher
12 Pushing finger
13 Rotary drive
14 Console
15 Rotary drive
15' Rotary drive
16 Belt drive
17 Pulley
18 Pulley
19 Bore
20 Housing
22 Hollow shaft
23 Shaft
24 Bell-shaped bearing
25 Direction
26 Belt conveyor
27 Depositing plate
28 Bore pattern
29 Transfer curve
30 Transfer point
31 Receiving point
32 Hollow glass article
33 Row

The invention claimed is:

1. An apparatus for horizontally pushing articles, particularly hollow glass articles, from a stationary depositing plate of an IS glass molding machine onto a belt conveyor that moves rectilinearly with a uniform speed, comprising:
a transfer pusher having an end that faces the articles and on which is situated at least one pushing finger intended for contacting the articles to be pushed;
a drive system that comprises a first rotary drive that is functionally connected to the other end of the transfer pusher and a second rotary drive that can be controlled independently of the first rotary drive, wherein said drive system is designed for realizing a transfer curve that begins at a receiving point on the depositing plate and ends at a transfer point on the belt conveyor and lies in a horizontal plane by superimposing two rotational movements generated by the first and second rotary drives;
wherein said one end of the transfer pusher is arranged rotatably in order to realize the first rotational movement about a vertical axis of a shaft generated by the first rotary drive;
wherein the transfer curve is otherwise realized by superimposing the first rotational movement with only the second rotational movement that is generated by the second rotary drive and takes place about a stationary axle extending parallel to and at a distance from the shaft;
wherein the second rotary drive is functionally connected to a rotary plate about said stationary axle, and wherein the shaft that carries the transfer pusher on its upper end is rotatably supported in the rotary plate; and wherein the first rotary drive is rigidly connected to the rotary plate such that the transfer curve is realized in the form of the superposition of the rotation of the rotary plate about said stationary axle caused by the second rotary drive and the rotation about the axis of the shaft that is caused by the first rotary drive that moves with the rotary plate together with the shaft.

2. The apparatus according to claim 1, wherein the first rotary drive is situated underneath the rotary plate and mounted on a bearing flange that is rigidly connected to the rotary plate, and in that the shaft is supported in the bearing flange.

3. The apparatus according to claim 1, further comprising a console that supports the apparatus and is configured for being mounted on the machine frame of an IS glass molding machine.

4. The apparatus according to claim 3, wherein the rotary plate is rigidly connected to a vertically extending hollow shaft, and in that the hollow shaft is supported such that it is rotatable about said stationary axle.

5. The apparatus according to claim 4, wherein the axle is supported on the console such that it carries the apparatus.

6. The apparatus according to claim 1, wherein the rotary plate is rigidly connected to a vertically extending hollow shaft, and in that the hollow shaft is supported on a stationary bell-shaped bearing.

7. The apparatus according to claim 6, wherein the rotary plate is functionally connected to the second rotary drive by means of a shaft that extends through the bell-shaped bearing.

8. The apparatus according to claim 7, wherein the second rotary drive is rigidly connected to the bell-shaped bearing.

9. The apparatus according to claim 6, wherein the bell-shaped bearing is supported on a console such that it carries the apparatus.

10. The apparatus according to claim 4, wherein the second rotary drive is rigidly connected to the hollow shaft underneath the rotary plate.

11. The apparatus according to claim 4, wherein the second rotary drive is functionally connected to the stationary axle.

12. The apparatus according to claim 1, further comprising a housing that accommodates all components of the drive system.

13. The apparatus according to claim 1, wherein the transfer curve, as well as the movement along this curve, is realized in such a way by controlling the first and second rotary drives that the articles are moved at least approximately tangential to the direction of and with the same speed as the belt conveyor in the transfer point.

14. The apparatus according to claim 2, further comprising a console that supports the apparatus and is configured for being mounted on the machine frame of an IS glass molding machine.

15. The apparatus according to claim 2, wherein the rotary plate is rigidly connected to a vertically extending hollow shaft, and the hollow shaft is supported such that it is rotatable about said stationary axle.

16. The apparatus according to claim 1, wherein the rotary plate is rigidly connected to a vertically extending hollow shaft, and the hollow shaft is supported such that it is rotatable about said stationary axle.

17. The apparatus according to claim 2, wherein the rotary plate is rigidly connected to a vertically extending hollow shaft, and the hollow shaft is supported on a stationary bell-shaped bearing.

18. The apparatus according to claim 3, wherein the rotary plate is rigidly connected to a vertically extending hollow shaft, and the hollow shaft is supported on a stationary bell-shaped bearing.

19. The apparatus according to claim 7, wherein the bell-shaped bearing is supported on a console such that it carries the apparatus.

20. The apparatus according to claim 8, wherein the bell-shaped bearing is supported on a console such that it carries the apparatus.

* * * * *